(12) United States Patent
Foucault et al.

(10) Patent No.: US 11,872,697 B2
(45) Date of Patent: Jan. 16, 2024

(54) COLLABORATIVE DEVICE WITH OPTIMISED CONTROL

(71) Applicant: FTS WELDING, Joué-lès-Tours (FR)

(72) Inventors: Paul Foucault, Chinon (FR); Roland Devy, Joué-lès-Tours (FR)

(73) Assignee: FTS WELDING, Joué-les-Tours (FR)

( * ) Notice: Subject to any disclaimer, the term of this patent is extended or adjusted under 35 U.S.C. 154(b) by 0 days.

(21) Appl. No.: 17/766,931

(22) PCT Filed: Oct. 6, 2020

(86) PCT No.: PCT/EP2020/077984
§ 371 (c)(1),
(2) Date: Apr. 6, 2022

(87) PCT Pub. No.: WO2021/069433
PCT Pub. Date: Apr. 15, 2021

(65) Prior Publication Data
US 2023/0027368 A1 Jan. 26, 2023

(30) Foreign Application Priority Data
Oct. 8, 2019 (FR) ...................................... 1911145

(51) Int. Cl.
*B23K 37/02* (2006.01)
*B25J 9/00* (2006.01)
(Continued)

(52) U.S. Cl.
CPC ......... *B25J 9/0081* (2013.01); *B23K 37/0229* (2013.01); *B25J 9/1664* (2013.01); *B25J 13/085* (2013.01); *B25J 15/0019* (2013.01)

(58) Field of Classification Search
CPC .... B25J 13/085; B25J 15/0019; B25J 9/1664; B23K 37/0229
(Continued)

(56) References Cited

U.S. PATENT DOCUMENTS

| 4,298,308 A | 11/1981 | Richter |
| 10,260,970 B2 | 4/2019 | Lauzier et al. |

(Continued)

FOREIGN PATENT DOCUMENTS

| EP | 1724072 A1 | 11/2006 |
| JP | H0976183 A | 3/1997 |

OTHER PUBLICATIONS

International Search Report dated Dec. 16, 2020 for corresponding International Application No. PCT/EP2020/077984, Oct. 6, 2020.
(Continued)

*Primary Examiner* — Dalena Tran
(74) *Attorney, Agent, or Firm* — David D. Brush; Westman, Champlin & Koehler, P.A.

(57) ABSTRACT

A collaborative device includes: a robotic arm including at least one motor; a tool secured to a free end of the robotic arm; a computer unit connected to the robotic arm to transmit instructions for controlling the robotic arm; and a joint having a flexible connection. The device integrates at least one sensor parameterised to detect forces exerted on the flexible connection. The computer unit is configured to: receive data from the sensor; translate the data into torques applied at the motor(s) of the robotic arm; generate instructions for attenuating the applied torques; and control the motor(s) of the robotic arm with the attenuation instructions.

13 Claims, 3 Drawing Sheets

(51) Int. Cl.
*B25J 9/16* (2006.01)
*B25J 13/08* (2006.01)
*B25J 15/00* (2006.01)

(58) Field of Classification Search
USPC ......................................................... 700/264
See application file for complete search history.

(56) References Cited

U.S. PATENT DOCUMENTS

| 2009/0301226 A1* | 12/2009 | Hirabayashi | ............ | G01L 5/162 |
| | | | | 73/862.626 |
| 2010/0109360 A1* | 5/2010 | Meisho | ................ | B25J 17/0208 |
| | | | | 901/32 |
| 2010/0180711 A1* | 7/2010 | Kilibarda | ............. | B25J 15/0483 |
| | | | | 219/136 |
| 2012/0215358 A1* | 8/2012 | Gettings | ................ | B25J 19/023 |
| | | | | 294/213 |

OTHER PUBLICATIONS

Written Opinion of the International Searching Authority dated Dec. 16, 2020 for corresponding International Application No. PCT/EP2020/077984, filed Oct. 6, 2020.

English translation of Written Opinion of the French Searching Authority dated Apr. 9, 2021 for corresponding French Application No. 1911145, filed Oct. 8, 2019.

English translation of the Written Opinion of the International Searching Authority dated Jan. 11, 2021 for corresponding International Application No. PCT/EP2020/077984, filed Oct. 6, 2020.

\* cited by examiner

COLLABORATIVE DEVICE WITH OPTIMISED CONTROL

CROSS-REFERENCE TO RELATED APPLICATIONS

This Application is a Section 371 National Stage Application of International Application No. PCT/EP2020/077984, filed Oct. 6, 2020, the content of which is incorporated herein by reference in its entirety, and published as WO 2021/069433 on Apr. 15, 2021, not in English.

FIELD OF THE DISCLOSURE

The field of the invention is that of the design and manufacture of collaborative work devices.

More specifically, the invention relates to a collaborative welding device.

BACKGROUND OF THE DISCLOSURE

By collaborative work device, it should be understood a device comprising a robot which evolves in the middle of humans. In particular, such a collaborative device can adopt an automatic mode in which it is autonomous and works without human intervention, and a manual mode in which a technician uses the device. In the manual mode, the technician can in particular collaborate with the robot, in particular to position parts before the robot acts on said parts.

Such collaborative devices are widely known. Thus, thanks to the advent of virtual reality and robotics, it is possible to replace tasks that are tedious for humans with tasks performed automatically by robots.

For this purpose, the robots have to learn the gestures they have to perform in place of human gestures.

In general, such learning is carried out digitally, i.e. the trajectory or the movements of the robot are created artificially by a computer.

The technician then creates, for example via software, a trajectory program of the arm so that the latter performs the tasks it has to perform.

The program can be generated either by assembling a succession of movements and actions to be carried out from a database, or by a processing program which then generates by itself the trajectories to be performed by the robot when the technician has defined the end result he wishes to obtain.

This approach has some drawbacks.

First of all, this method might require processing time, especially when the program is made up from a succession of trajectories and actions to be performed by the robot, each trajectory and action having to be determined by the technician beforehand.

Hence, before defining the program, the technician must take the time to identify the most suitable sequence for the production of his part(s).

Secondly, it is possible that some trajectories could not be optimised for a future trajectory. Indeed, robots only do what they are asked to do. Consequently, unlike humans, the robot performs the tasks sequentially, i.e. one after the other, without anticipating a future task.

On the contrary, a Human will generally seek to use an optimised trajectory in order to make life easier.

Henceforth, a trajectory performed by computer for the control of robots is not optimised and might have some defects.

In the case of a welding arm, for example, the optimisation of the trajectories is important.

Indeed, to obtain some welds in locations that are difficult to access, for example, the welding torch must have a well-defined inclination.

Such an inclination might be difficult to compute or to determine by the technician in order to make the robot replicate it.

Although this is still possible, the optimisation of trajectories is generally dedicated for the production of parts in large series, as for example in the automotive industry for which the manufacture of identical parts could be carried out for several years.

Indeed, such an optimisation requires a significant implementation time that operators do not, or barely, have for the production of parts in small or medium series.

SUMMARY

An exemplary aspect of the present disclosure relates to a collaborative device comprising:
 a robotic arm including at least one motor;
 a tool secured to a free end of the robotic arm;
 a computer unit connected to the robotic arm to transmit instructions for controlling the robotic arm,
 the device being able to adopt at least:
 a learning mode in which the tool is moved by a technician, and
 an automatic mode in which the robotic arm replicates a trajectory manually performed by the technician in the learning mode,
 characterised in that the device also comprises a joint interposed between the robotic arm and the tool, the joint having:
 a first portion secured to the robotic arm;
 a second portion secured to the tool;
 a flexible connection interposed between the first portion and the second portion,
 the device integrating at least one sensor parameterised to detect forces exerted on the flexible connection when the tool is moved by the technician, in the learning mode of the device,
 the computer unit being configured to:
 receive data from the sensor;
 translate said data into torques applied at said motor(s) of the robotic arm;
 generate instructions for attenuating the applied torques,
 control said motor(s) of the robotic arm with the attenuation instructions, to limit a brake effect of the motors, during the movement of the tool by the technician in the learning mode.

Thus, this device enables a technician to create a trajectory to be recorded by the computer unit to generate an automated program for the robotic arm.

Furthermore, the handling of the tool by the technician is facilitated thanks to the learning mode and in particular the translation of the applied torques and the generation of the attenuation instructions.

Indeed, these attenuation instructions allow controlling the motors of the robotic arm to perform a movement opposite to the load exerted by the technician.

In other words, when the technician moves the tool, the attenuation instructions allow controlling the motors of the robotic arm so that they do not act as a brake to the movement of the tool, this corresponding to the brake effect of the motors. Henceforth, the technician does not, or almost does not, feel the arm when he moves the tool. Hence, the motors of the robotic arm are controlled as an accompaniment to the robotic arm, i.e. the motors are driven in the direction imposed by the operator.

Furthermore, thanks to the sensor, the generated program can faithfully recreate the movement of the tool by the technician when the device is used automatically.

Advantageously, in the automatic mode, the computer unit is configured to:

- generate a work program comprising at least one trajectory of the tool, from the data received from the sensor and/or from positions of the motors of the robotic arm, in the learning mode;
- controlling said motor(s) of the robotic arm with said work program.

In this automatic mode, the robotic arm can thus recreate the trajectory performed manually by the technician, thereby allowing creating identical work phases in series.

According to a first embodiment, the computer unit is configured to execute a replication of the movement of the tool at a speed identical to that applied by the technician in the learning mode.

In this case, the movement of the tool in the automatic mode is strictly identical to the movement of the tool performed by the technician in the learning mode.

In particular, this allows maintaining an appropriate speed when the tool is active, such a speed may have been desired by the technicians in particular for a reason relating to work quality.

According to a second embodiment, the computer unit is configured to smooth the speed of movement of the tool by the robotic arm according to a constant target speed.

In particular, this allows being able to reach a desired production rate during the repetition of the trajectories by the robotic arm.

Moreover, it is possible to know at any time in which position the tool will be or, on the contrary, be able to determine a position in which the tool should be at a time point desired by the technicians. This also allows carrying out a quality control without interrupting the production.

According to a third embodiment, the computer unit is configured to increase the speed of movement of the tool when it is in an inactive state.

Thus, it is possible to increase the manufacturing rates of the device.

Indeed, when the tool is active, some conditions, in particular the speed of movement, should be met to ensure the quality of the work performed by the tool and to avoid any danger for the technicians who move proximate to the robotic arm.

Conversely, when the tool is inactive, the travel times of the tool, in particular to return to a starting point or to change the action zone, could be shortened so as to reduce the production time and therefore increase the production rates.

Preferably, the computer unit is configured to smooth the trajectories of the work program.

Thus, it is possible to further increase the production quality of the device.

During learning, the technician who handles the tool could, unintentionally, generate disturbances in his movements, in particular when he has to lean on several successive points in order to stabilise the tool in operation.

Hence, the smoothing of the trajectories allows correcting any jerks or jolts caused by the change of position of the technician during the learning phase.

Moreover, some positions might be difficult for a technician to hold, and the latter might shake or hesitate when handling the tool. Hence, the smoothing of the trajectories allows eliminating these shakes to further improve the quality of production by the robotic arm.

According to a particular embodiment, the tool is a welding torch.

This tool, which is generally handled manually by a technician, could allow performing accurate and quick welds in an automated manner thanks to the presence of the robotic arm.

Advantageously, the welding torch has a tube inside which a welding wire guide is inserted.

This allows being able to quickly and efficiently change either the welding torch according to the production characteristics or needs, but also the welding wire type, always according to the production characteristics.

Preferably, the wire guide is inserted with clearance into the tube.

This allows avoiding any contact between the wire guide and the torch, so that an unexpected or unintentional movement of the torch, a resonance or vibration of the latter, has no consequence on the quality of the completed weld.

According to a preferred embodiment, the welding torch comprises a handle extended at one of its ends by the tube, the second portion of the joint being mounted at the junction between the handle and the tube.

Such a feature allows for a good grip and an ease of use of the torch for the technician. Indeed, conventionally, a technician grasps a torch by the handle and can possibly guide the movement of the torch using his free hand as a guide on which the tube rests.

In this case, the user uses his free hand as a guide on which the tube rests, the position of the second portion of the connection or of the joint then allowing for an easy manoeuvring since handling and gripping of the welding torch by the technician do not, or almost do not, differ from gripping and handling a torch in the usual way, i.e. outside the collaborative device.

Preferably, the welding torch comprises at least one double-contact button including:

- a first contact for authorising a weld;
- a second contact for controlling the computer unit and generating the work program.

Thus, the technician can continue using the welding torch in a fully manual way, i.e. as if the torch were not connected to the robotic arm, and in this case perform several test passes before creating a work program.

When a use and a welding result are satisfactory for the technician, thanks to the second contact, the computer unit can automatically generate the work program of the device, which will then be replicated by the robotic arm.

Advantageously, the device comprises a panel for setting parameters of the tool, the computer unit being coupled to the setting panel and configured to take into account data from the setting panel and generate the attenuation instructions and the work program.

Thanks to the manufacturing parameters, i.e. the data of the setting panel, the computer unit can carry out the operations of smoothing, increasing the speed or decreasing the speed of movement of the tool, or still the attenuation instructions without this affecting the production quality. Indeed, the different materials to be welded or the different types of wires might require special conditions for performing the weld.

BRIEF DESCRIPTION OF THE DRAWINGS

Other features and advantages of the invention will appear more clearly upon reading the following description of a preferred embodiment of the invention, provided as an illustrative and non-limiting example, and from the appended drawings, among which

DETAILED DESCRIPTION OF ILLUSTRATIVE EMBODIMENTS

Figure 1:
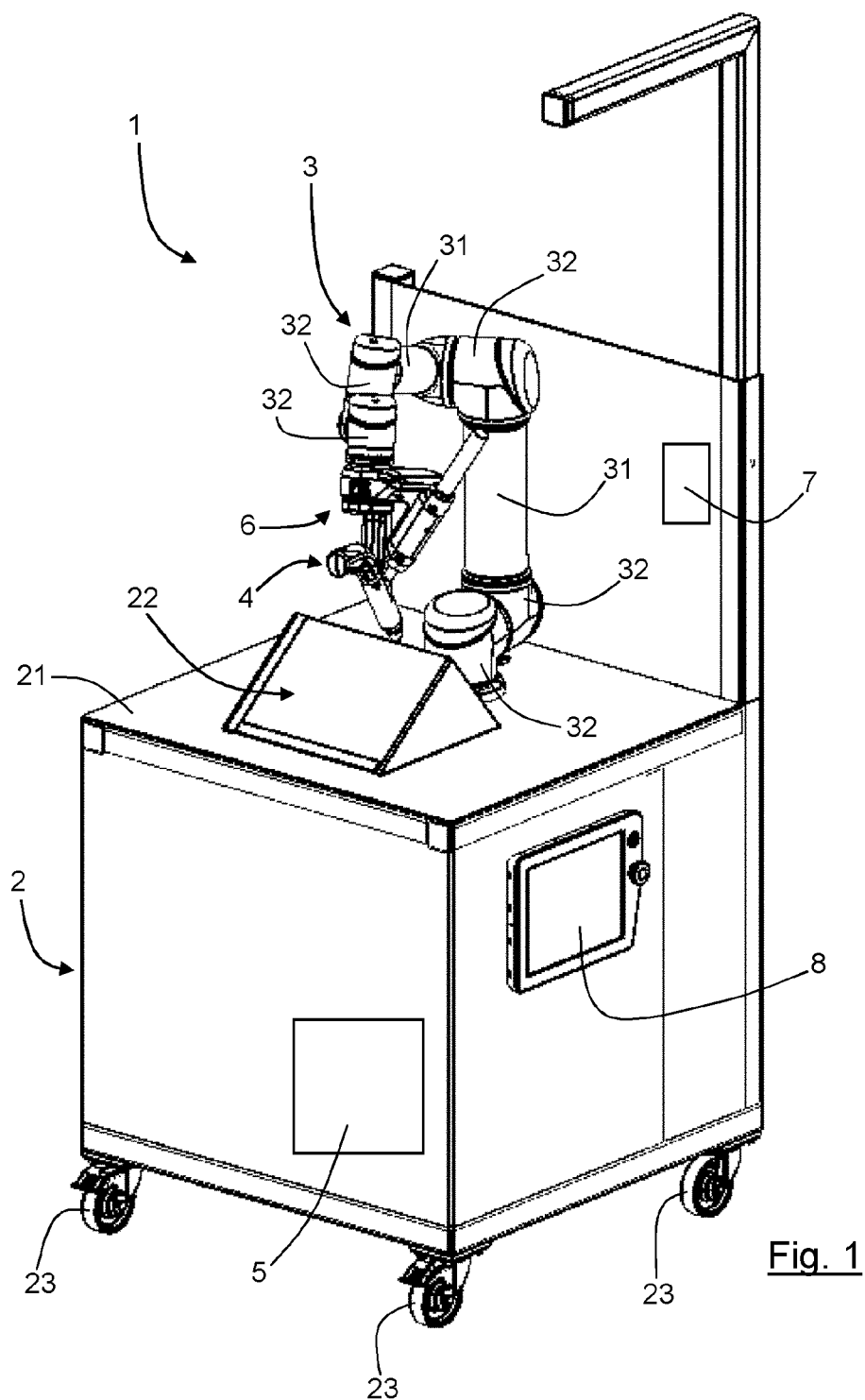
FIG. 1 is a perspective view of a collaborative device according to the invention, comprising a robotic arm and a welding torch.

FIG. 1 illustrates a collaborative device 1 according to the invention.

By collaborative device, it should be understood a device comprising a robot which evolves in the middle of humans. In particular, such a collaborative device can adopt an automatic mode in which it is autonomous and works without human intervention, and a manual mode in which a technician uses the device. In the manual mode, the technician can collaborate with the robot to position parts before the robot acts on said parts.

This device 1 comprises:
a frame 2;
a robotic arm 3 mounted on the frame 2;
a tool 4 secured to a free end of the robotic arm 3;
a computer unit 5 connected to the robotic arm 3 to transmit control instructions to the robotic arm 3.

The device 1 can adopt:
a learning mode in which the tool 4 is moved by a technician;
an automatic mode in which the robotic arm 3 moves the tool 4, the robotic arm 3 being controlled by the computer unit 5, as explained hereinafter.

Referring to FIG. 1, the frame 2 is in the form of a box defining a work surface 21 on which a welding console 22 is mounted.

The console 22 is a movable element that could be detached from the work surface 21 where needed, this console 22 being adaptable to the different parts to be made.

Advantageously, the frame 2 is movable and, for this purpose, comprises four casters 23 to be able to be moved in a workshop.

The robotic arm 3 is secured to the frame 2 by a first end and comprises several sections 31 connected to each other by motors 32.

Thus, the motors 32 form bends between each of the sections 31 allowing imparting several positions to the robotic arm 3.

Figure 2:
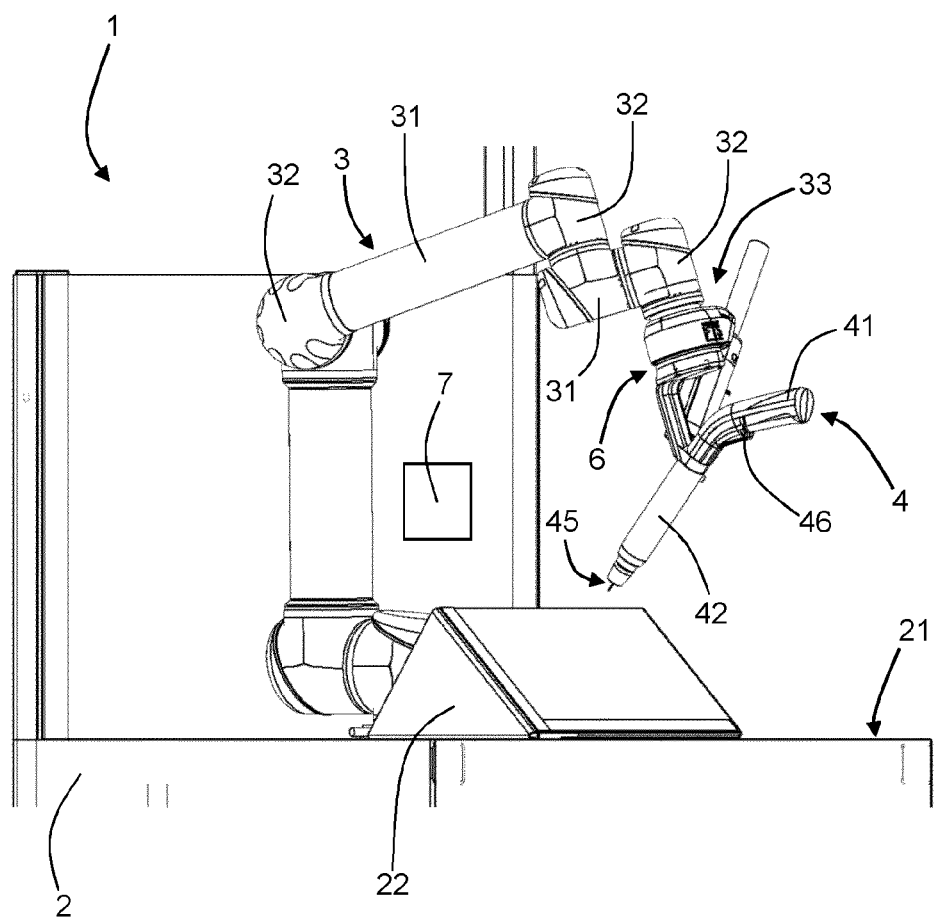
FIG. 2 is a side view of a collaborative device according to the invention, showing a work area of the tool.
Figure 3:
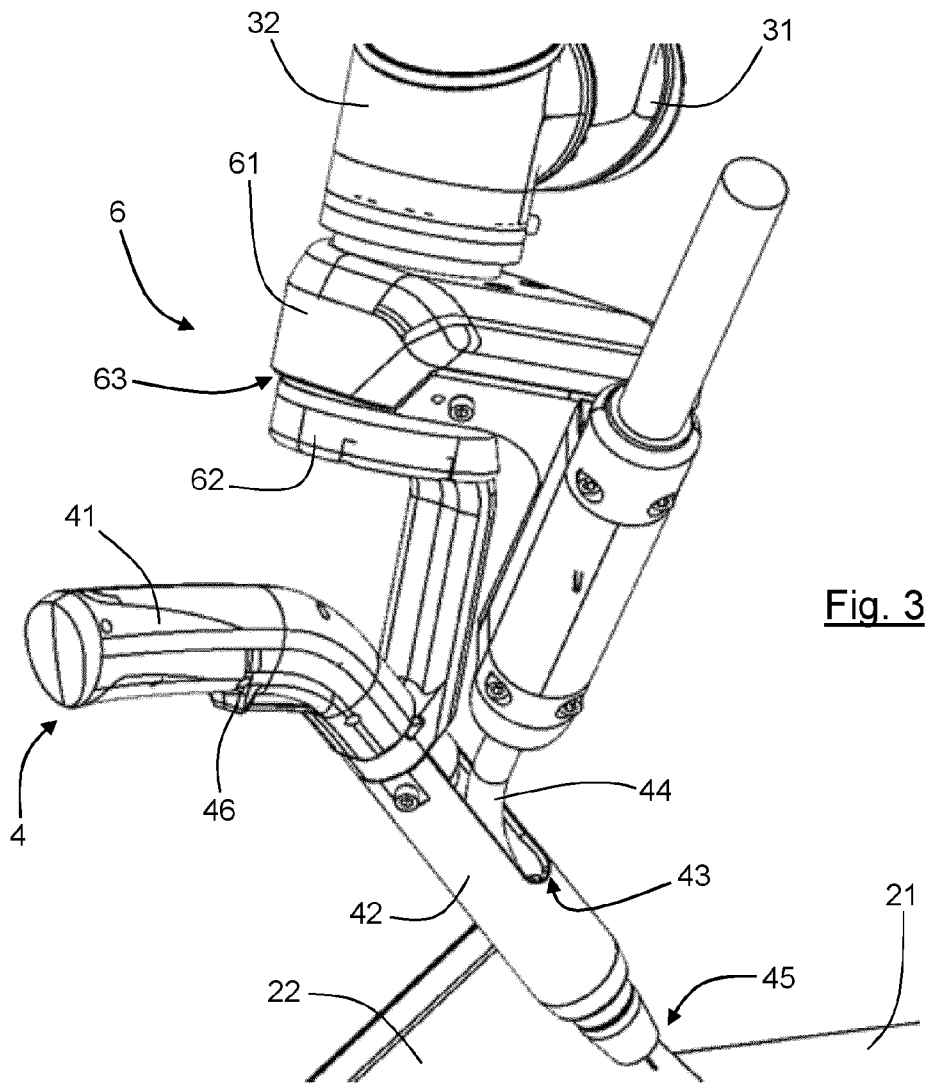
FIG. 3 is a detail view of the welding torch of the collaborative device according to the invention.

Referring to FIGS. 2 and 3, the robotic arm 3 also has a free end 33 at the tip of which or to which the tool 4 is secured.

More particularly, as shown in FIGS. 1, 2 and 3, the tool 4 is a welding torch which is mounted on the robotic arm 3.

To ensure mounting of the tool 4 on the robotic arm, the device also comprises a joint 6 interposed between the robotic arm 3 and the tool 4.

As shown in more details in FIG. 3, this joint 6 has:
a first portion 61 secured to the robotic arm 3;
a second portion 62 secured to the tool 4;
a flexible connection 63 interposed between the first portion 61 and the second portion 62.

By deforming, the flexible connection 63 enables movements of the tool 4 relative to the robotic arm 3.

As illustrated in FIG. 3, the device 1 also comprises a sensor 7 parameterised to detect forces exerted on the flexible connection 63 when the tool 4 is moved by a technician.

According to the embodiment illustrated in FIG. 1 and FIG. 2 in particular, the sensor is secured to the frame 2. Alternatively, the sensor 7 could be integrated to the joint 6, and in particular housed within the flexible connection 63.

Advantageously, the sensor 7 is secured to the tool 4 and is located under the joint 6.

The sensor 7 is connected to the computer unit to enable the latter to acquire the data from the sensor and to process them in order to control the robotic arm.

More specifically, the computer unit 5 is configured to:
receive data from the sensor 7;
translate said data into torques applied at said motor(s) 32 of the robotic arm 3;
generate instructions for attenuating the applied torques;
control said motor(s) 32 of the robotic arm 3 with the attenuation instructions.

In other words, the computer unit 5 receives the data on the deformation of the flexible connection 63 of the joint 6 then processes them and transforms them into instructions for controlling the robotic arm 3.

As illustrated by FIG. 1, the device 1 also comprises a panel 8 for setting parameters of the tool 4.

For example, this panel 8 may be in the form of a touchpad, secured or not to the frame 2, enabling a technician to enter the various welding parameters, such as the advance of the welding wire or an amount of gas to be used.

Referring to FIG. 3, the welding torch, i.e. the tool 4, comprises a handle 41 extended at one of its ends by a hollow tube 42.

The hollow tube 42 has an opening 43 through which a welding wire guide 44 is inserted to emerge at an open end 45 of the hollow tube 42, the open end 45 being opposite to the handle 41 of the welding torch.

Advantageously, the wire guide 44 is mounted with clearance inside the hollow tube 42 to allow ensuring that the position of the wire during welding is not altered and that welding quality is preserved, in the event of unintentional manipulation or vibration of the welding torch.

The welding torch also comprises at least one button 46 enabling the technician to interact either with the torch itself to authorise welding, or with the computer unit 5.

This button 46 is a two-contact button including:
a first contact to authorise welding;
a second contact to control the computer unit 5.

More particularly, by controlling the computer unit 5, the second contact allows generating the work program of the robotic arm 3.

In operation, the technician firstly chooses to use the device 1 in a fully manual mode, i.e. he performs the welds himself, and only the first contact of the button 46 of the welding torch is used.

The user then moves the welding torch as he sees fit and positions it, then actuates the button 46, the time necessary, to cause the welding and to achieve the assembly of two parts together.

The user can also select a learning mode of the device to enable him to repeat, via the automatic mode, a desired welding operation.

For this purpose, the technician uses the learning mode and moves the torch then actuates the first contact of the button 46 in order to perform the weld(s) he wishes. The user can perform a continuous weld by holding the button 46 on the first contact when moving the torch.

The technician can repeat his manipulation as many times as he wishes, until obtaining the result with the quality he wishes.

In the manual mode or in the learning mode, the computer unit then uses the data from the sensor 7, i.e. data on the deformation of the flexible connection 63 due to handling of the torch by the user.

The computer unit 5 then translates this data into torques applied at said motor(s) 32 of the robotic arm 3.

The computer unit 5 then generates instructions for attenuating the applied torques which it sends back to the motors 32 of the robotic arm 3 to control these.

Sending of the attenuation instructions is instantaneous, i.e. the motors of the robotic arm 3 are controlled as soon as the technician moves it.

This thus allows relieving the motors 32 from a torque that they could exert against the movements desired by the technician.

In other words, without the control of the motors 32 by the computer unit, when the technician moves the welding torch, the movement is braked or, at the very least slowed down, by the robotic arm 3, and in particular by the motors 32 of the robotic arm 3 which have a resistant torque.

Thanks to the immediate control, the robotic arm 3 then becomes transparent to the technician and it causes no, or almost no, discomfort when moving the welding torch. The brake effect of the motors 32 is limited.

By immediate control, it should be understood that the robotic arm 3 is controlled instantaneously, as soon as the sensor 7 detects a deformation of the flexible connection 63 of the joint 6.

To perform a weld automatically, the user controls the device 1 to position it in the automatic position.

Thanks to the second contact of the button 46, the various data received from the sensor 7 and/or from the motors 32 of the robotic arm 3, in the learning mode, are then also translated by the computer unit for the execution in the automatic mode of the movements of the robotic arm 3.

Indeed, by pressing the second contact of the button 46, the computer unit 5 is also configured to generate the work program comprising at least one trajectory of the tool 4, and to control the motor(s) 32 of the robotic arm 3 with said work program.

More specifically, the different movements exerted by the technician during the learning phase could be replicated by the arm 3 to accurately perform the same movement but, this time, automatically.

For this purpose, the computer unit 5 preferably uses the position of the motors 32 of the robotic arm 3 when the technician moves the tool 4. Of course, complementarily and for more accuracy, the data from the sensor 7 could also be used to generate the work program.

Depending on the production parameters desired by the technician, the computer unit 5 could also be configured to execute a replication of the movement of the tool 4 at a speed identical to that applied by the technician in the learning mode.

Thus, if the technician is an expert for whom the settings and the speed of movement of the torch are perfectly mastered, then the quality of the weld replicated automatically will be identical to that of the technician.

Conversely, in the case of a junior technician for example, whose gestures might be shaky or unsteady, the computer unit 5 could be configured to smooth the speed of movement of the tool 4 by the robotic arm 3 according to a constant speed, or even smooth the trajectories of the work program.

Indeed, for a junior technician, a constant speed could not be met, thus making the weld bead unsightly, i.e. featuring non-constant thicknesses along its length, but also, mechanical strength weaknesses, because of the differences in thickness.

These shakes could be attenuated by smoothing the trajectories to obtain an aesthetic weld bead that offers good guarantees in terms of mechanical strength.

In the event of increased speed or production conditions, the computer unit 5 could also be configured to increase the speed of movement of the tool 4 when the latter is in an inactive state.

In other words, when the tool 4, i.e. the welding torch, is not used to weld two parts together, it can be moved more quickly to reduce the manufacturing time.

This is particularly useful between a cycle end point and a cycle start position of the welding torch.

The previously-described collaborative device 1 allows replicating the gestures of a technician automatically, by direct learning of said gestures of the technician.

Indeed, in contrast with a trajectory program created only theoretically, for example by computer, besides the acquisition of the different welding locations, the use of the trajectory through a manipulation of the technician allows obtaining the desired inclinations of the welding torch allowing achieving the desired weld bead.

Furthermore, the instantaneous or real-time control of the robotic arm 3 during the learning phase allows avoiding hindering the technician when he moves the welding torch, that being so in order to generate a work program that is as fluid as possible for the robotic arm 3.

Finally, during learning, the robotic arm 3 does not form a hindrance for the technician who could then perform a weld bead serenely and in a conventional manner.

An exemplary embodiment of the present disclosure overcomes at least some of the drawbacks of the prior art.

An exemplary embodiment provides a collaborative device that enables a technician to record a trajectory for the robotic arm in a simple way.

An exemplary embodiment provides such a device which is easy to handle for the technician.

An exemplary embodiment provides such a device which ensures an optimised trajectory and orientation of the robot and its tools.

Although the present disclosure has been described with reference to one or more examples, workers skilled in the art will recognize that changes may be made in form and detail without departing from the scope of the disclosure and/or the appended claims.

The invention claimed is:

1. A collaborative device comprising:
   a robotic arm including at least one motor;
   a tool secured to a free end of the robotic arm;
   a computer unit connected to the robotic arm to transmit instructions for controlling the robotic arm;
   a joint interposed between the robotic arm and the tool, the joint having:
     a first portion secured to the robotic arm; and
     a second portion secured to the tool; and
   a flexible connection interposed between the first portion and the second portion,
   the device being configured to adopt at least:
     a learning mode in which the tool is moved by a technician, and
     an automatic mode in which the robotic arm replicates a trajectory manually performed by the technician in the learning mode, the device integrating at least one sensor parameterised to detect forces exerted on the flexible connection when the tool is moved by the technician, in the learning mode of the device, the computer unit being configured to:
- receive data from the sensor during the learning mode;
- translate said data into torques applied at said at least one motor of the robotic arm during the learning mode;
- generate instructions for attenuating the applied torques; and
- control said at least one motor of the robotic arm with the attenuation instructions during the movement of the tool by the technician in the learning mode to limit a brake effect of a resistance torque of the at least one motor against the movement of the tool by the technician in the learning mode.

2. The device according to claim 1, wherein, in the automatic mode, the computer unit is configured to:
- generate a work program comprising at least one trajectory of the tool, from the data received from the sensor and/or from positions of the at least one motor of the robotic arm, in the learning mode;
- controlling said at least one motor of the robotic arm with said work program.

3. The device according to claim 2, wherein the computer unit is configured to execute a replication of the movement of the tool at a speed identical to that applied by the technician in the learning mode.

4. The device according to claim 2, wherein the computer unit is configured to smooth speed of movement of the tool by the robotic arm according to a constant target speed.

5. The device according to claim 2, wherein the computer unit is configured to increase speed of movement of the tool when the tool is in an inactive state.

6. The device according to claim 2, wherein the computer unit is configured to smooth the trajectories of the work program.

7. The device according to claim 1, wherein the tool is a welding torch.

8. The device according to claim 7, wherein the welding torch has a tube inside which a welding wire guide is inserted.

9. The device according to claim 8, wherein the wire guide is inserted with clearance into the tube).

10. The device according to claim 8, wherein the welding torch comprises a handle extended at one of its ends by the tube, the second portion of the joint being mounted at the junction between the handle and the tube.

11. The device according to claim 7, wherein the welding torch comprises at least one double-contact button including:
- a first contact for authorising a weld;
- a second contact for controlling the computer unit and generating the work program.

12. The device according to claim 1, wherein the device comprises a setting panel for setting parameters of the tool, the computer unit being coupled to the setting panel and configured to take into account data from the setting panel and generate the attenuation instructions and the work program.

13. The device according to claim 1, wherein the computer unit is further configured to:
- generate the instructions for attenuating the applied torques and send the instructions to the at least one motor as soon as the at least one sensor detects the forces exerted on the flexible connection when the tool is moved by the technician, in the learning mode of the device.

* * * * *